Feb. 25, 1969
H. J. URBANOSKY
3,430,181
ELECTRICAL AND FLUID LINE COUPLING APPARATUS
FOR CONNECTING WELL TOOL SECTIONS
Filed Oct. 3, 1966
Sheet 1 of 5
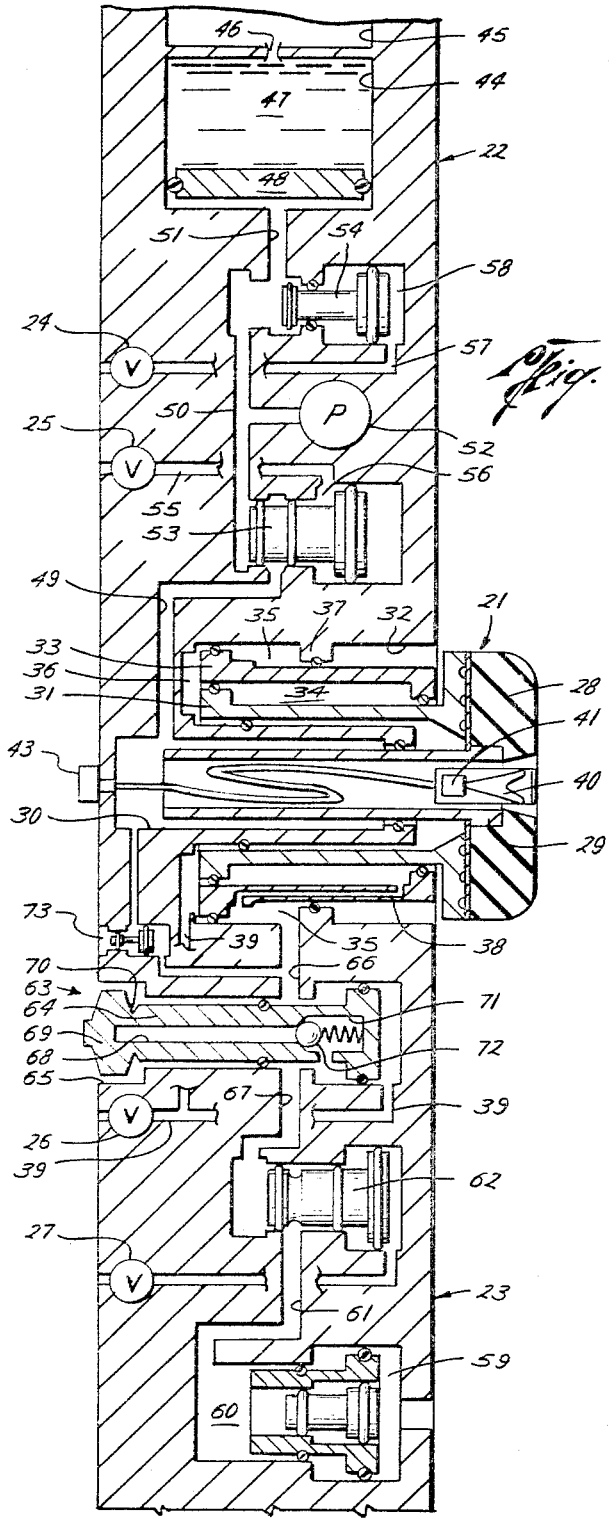
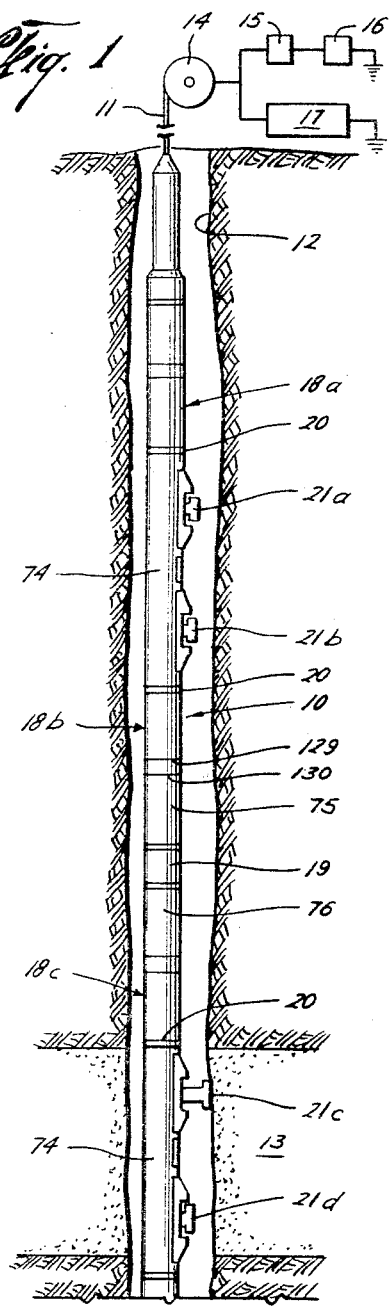
Harold J. Urbanosky
INVENTOR.
BY
ATTORNEY

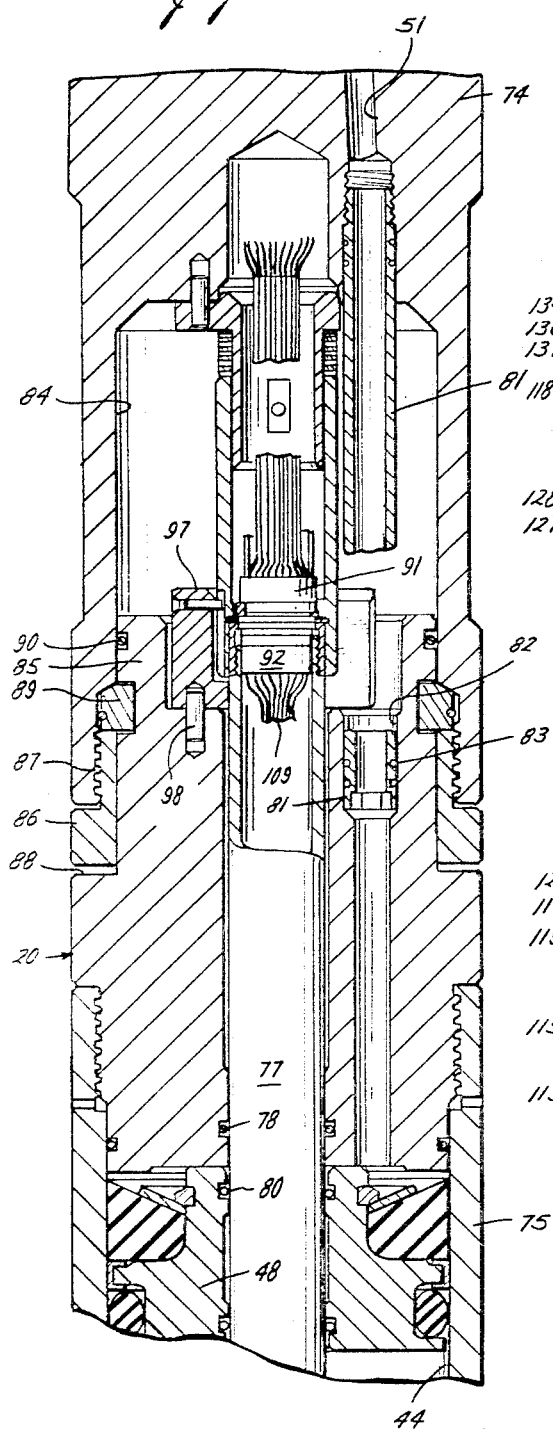
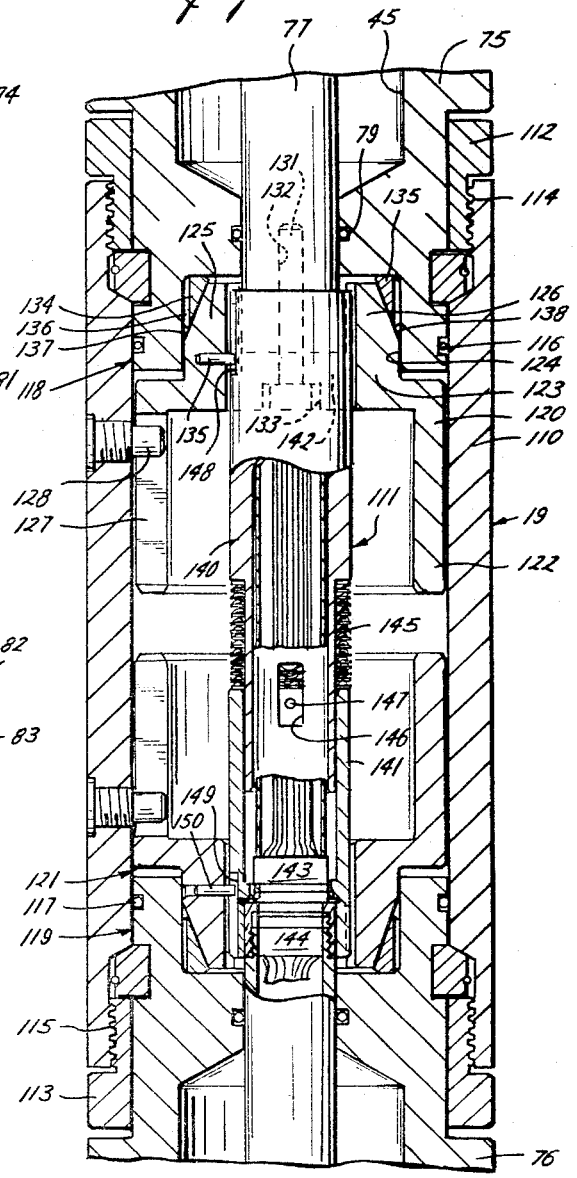
Harold J. Urbanosky
INVENTOR.

Harold J. Urbanosky
INVENTOR.

United States Patent Office 3,430,181
Patented Feb. 25, 1969

3,430,181
ELECTRICAL AND FLUID LINE COUPLING APPARATUS FOR CONNECTING WELL TOOL SECTIONS
Harold J. Urbanosky, Houston, Tex., assignor to Schlumberger Technology Corporation, Houston, Tex., a corporation of Texas
Filed Oct. 3, 1966, Ser. No. 583,778
U.S. Cl. 339—16     21 Claims
Int. Cl. H01r 3/04, 13/20; E21b 43/00

ABSTRACT OF THE DISCLOSURE

This invention disclosed herein is directed to new and improved coupling apparatus for facilitating the quick and foolproof connection and disconnection of electrical and fluid lines intercoupling multi-sectional well tools.

---

The present tendency toward smaller diameter well bores as well as toward more elaborate well completion operations has made it necessary for well tools to be substantially longer than heretofore. As a result, many well tools are of such length today that they must be made in separable sections that are taken separately to a well and then coupled together before being used. It will be appreciated, of course, that a rig floor is not a particularly desirable workshop. Moreover, any coupling or uncoupling of such multi-sectional well tools must be done as quickly as possible to minimize the time that other well operations are halted. It is, of course, essential that the sections be coupled together with little or no risk of either damaging or misconnecting their interconnections. It will also be recognized that typical manufacturing tolerances can "accumulate" as various elements of a multi-sectional tool are assembled. Thus, either the relative orientation or the longitudinal position of elements separated from one another can vary quite appreciably from a desired reference depending upon these manufacturing tolerances. Such "tolerance accumulations" can also, therefore, make it more difficult to couple a multi-sectional well tool together.

Accordingly, it is an object of the present invention to provide new and improved means for coupling multi-sectional well tools having interconnecting electrical or fluid lines, which means do not require special tools, careful attention, or particular techniques to reliably connect and disconnect these sections with a minimum of effort. Moreover, typical fabrication tolerances will be compensated for by the present invention. This and other objects of the present invention are provided by arranging on the ends of such well tool sections interconnectors respectively having separable first and second mating members and a suitable coupling arrangement such as a threaded collar rotatably mounted on one tool section and mating threads on the other tool section. A guide on one mating member is adapted for co-engagement with a first so-called "coarse" alignment guide on the second mating member that is itself cooperatively arranged with respect to a second so-called "fine" alignment guide on the second member to progressively orient and align the mating members properly as they are being co-engaged by tightening of the collar onto its mating threads. In this manner, a plurality of sections can be connected in any order without regard as to which section is connected to another.

The novel features of the present invention are set forth with particularity in the appended claims. The operation together with further objects and advantages thereof, may best be understood by way of illustration and example of certain embodiments when taken in conjunction with the accompanying drawings, in which:

FIG. 1 shows a well tool such as might be used with the present invention;

FIG. 2 is a simplified, schematic representation of one section of the apparatus depicted in FIG. 1;

FIGS. 3A and 3B are successive cross-sectional views of a portion of the apparatus depicted in FIG. 1 and show two interconnectors of the present invention;

Figure 4:
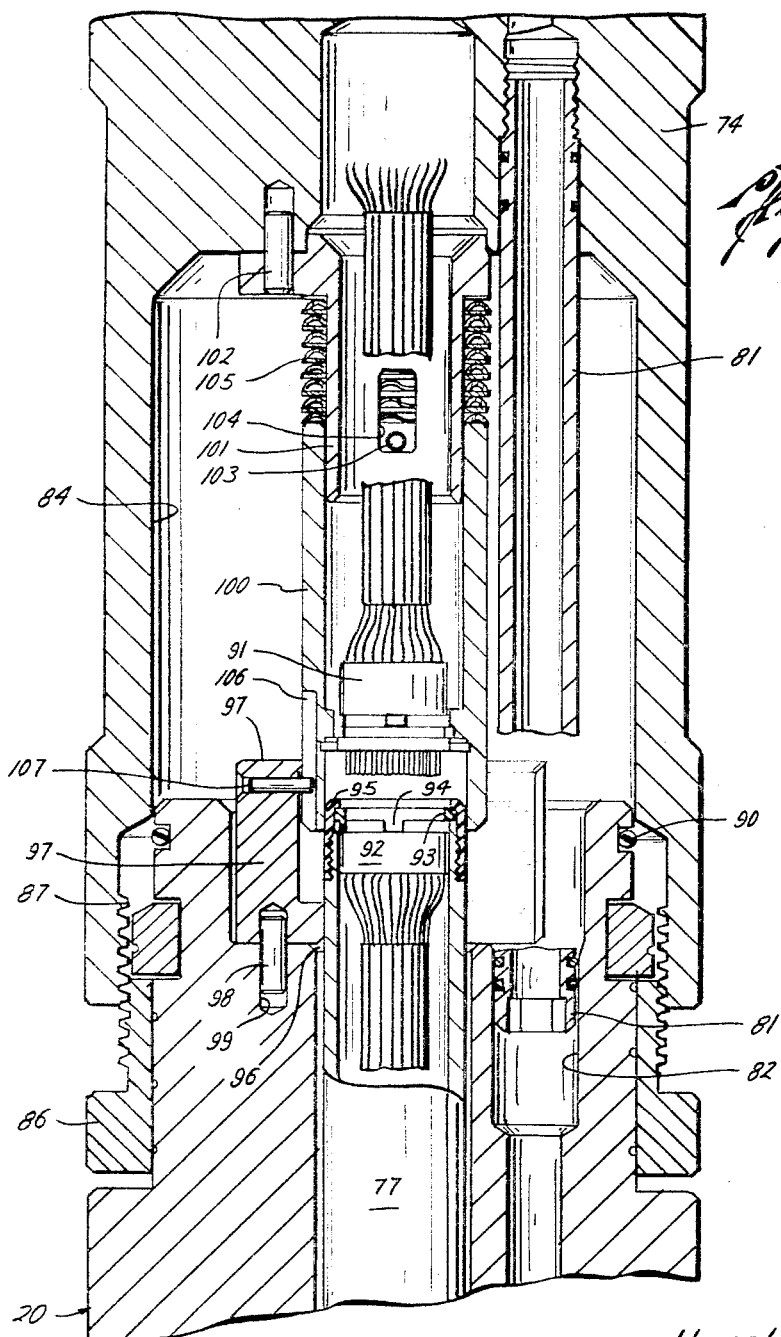
FIG. 4 is a cross-sectional elevation view of one of the interconnectors shown in FIGS. 3A and 3B while it is partially co-engaged.

It will be understood that the present invention has utility with any multi-sectional well tool having either electrical or fluid lines, or both, that are interconnected when the well tool is assembled. Accordingly, although one particular tool has been selected as a typical example of the employment of the invention, the interconnectors of the present invention can be used with any multi-sectional well tool. Inasmuch as this exemplary well tool is fully described in a copending application, Ser. No. 557,108, filed June 13, 1966, by Frank R. Whitten and now Patent No. 3,385,364, only a brief description of this well tool is believed necessary to illustrate the present invention.

Turning now to FIG. 1, multi-sectional fluid-sampling apparatus 10 is shown suspended from a multi-conductor cable 11 in a borehole 12 and adjacent a formation interval 13 for collecting a sample of producible fluids therefrom. The cable 11 is spooled in the usual manner from a winch 14 at the earth's surface, with some of its conductors being connected to a switch 15 for selective connection to a power source 16 and others being connected to typical indicating-and-recording apparatus 17.

The fluid-sampling apparatus 10 is comprised of a plurality of tandemly arranged, self-contained testing tools 18 that are coupled together with the interconnectors of the present invention, as for example at 19, with each tool being capable of independent operation to take a plurality of samples in a single trip into the borehole 12. The tools 18 are in turn comprised of separable sections that are also coupled together by other interconnectors, as at 20, of the present invention. Each of the tools 18 have extendible sample-admitting means 21 along one side of the sample apparatus 10. As shown in FIG. 1, the sample-admitting means 21c for the testing tool 18c have been extended and sealingly engaged against the exosed face of the formation 13 for obtaining a sample of any formation fluids therein. It will be further noted that the sample-admitting means 21 are all aligned in a common vertical plane. This alignment, of course, makes possible for the apparatus 10 to pass through a smaller well bore than if this alignment were not maintained. As will subsequently become apparent, it is possible to conveniently maintain this alignment only by virtue of the interconnectors 19 and 20.

To appreciate the necessity of having to interconnect a plurality of electrical and fluid lines, a testing tool 18 is shown schematically in FIG. 2. As seen there each testing tool 18 is basically comprised of the extendible sample-admitting means 21 for obtaining samples of formation fluids, sample-collecting means 22 for recovering the samples, and retracting means 23 for restoring the sample-admitting means to their initial position. Each of these pressure-responsive means 21–23 are independently controlled by separate, selectively operable valves 24–27 which, by means of electrical signals from the surface, are opened in a particular sequence to admit borehole fluids to these pressure-responsive means as their source of motivating power.

The sample-admitting means 21 include an annular, elastomeric sealing member 28 mounted on the outer end of a tubular member 29 that is slidably disposed within a lateral bore 30 and fluidly sealed therein. A tubular piston member 31 is disposed in an enlarged annular bore 32 concentrically formed around the lateral bore 30 and arranged to move the sealing member 28 into and out of engagement with the earth formation. The piston 31 is telescopically fitted into a coaxially aligned sleeve member 33 itself slidably received in the bore 32 to increase the distance that the sealing member 28 can be extended.

The rearward end of the piston 31 and forward end of the sleeve 33 are fluidly sealed relative to one another to provide an enclosed annular space 34 therebetween. Similarly, fluid-tight spaces 35 and 36 are respectively provided in the annular bore 32 between the rear of the sleeve 33 and a fixed shoulder 37 as well as behind the piston 31 and the sleeve. A passage 38 through the sleeve 33 between the enclosed spaces 34 and 35 ensures that these spaces will remain at atmospheric pressure during the initial operation of the tool 18. By admitting well control fluids into the enclosed space 36 (via the valve 26 and an associated passage 39), the piston 31 will be urged outwardly to compress the sealing member 28 against one wall of the borehole 12. The rear of the tool 18 will, of course, be engaged against the opposite borehole wall.

To provide increased fluid communication with an earth formation, an encapsulated shaped charge 40 is mounted in the forward end of the tubular member 29. An electrically responsive detonator 41 at the rear of the shaped charge 40 is connected through an electrical conductor 42 extending through the tubular member 29 to a suitable fluid-tight connector 43.

The sample-collecting means 22 include separate receiving compartments 44 and 45 separated from one another by a flow restrictor 46. A water cushion 47 is disposed in one compartment 44 and isolated therein by a floating piston 48. Since the other compartment 45 is initially empty, formation fluids (at whatever the formation pressure is) will enter the compartment 44 and move the piston 48 at a rate regulated by the discharge of the water cushion 47 through the orifice 46 and into the other compartment.

To conduct a fluid sample from the sample-admitting means 21 to the receiver, the sample-collecting means 22 include fluid passage means, such as a series of interconnecting passages 49–51 between the rear of the lateral bore 30 and the compartment 44. A pressure transducer 52 connected to the passage 50 provides an electrical signal representative of the fluid pressure therein that is transmitted through the cable 11 to the indicating-and-recording apparatus 17 at the surface. Selectively operable valve means, such as a normally-closed, piston-operated valve 53 serially arranged with a normally-open piston-operated valve 54, are provided to control fluid communication through the passages 49–51. The so-called "flow-line" valve 53 prevents entry of well control fluids through the central opening of the sealing member 28 and into the sample-receiving compartment 44 as the apparatus 10 is being positioned. The flow-line valve 53 is controlled by the selectively operated valve 25 which, when opened, admits well control fluids through an associated passage 55 into an annular piston space 56. The so-called "seal" valve 54 is provided to close-off the sample compartment 44 once a fluid sample is collected and is closed whenever the control valve 24 admits well control fluids through a passage 57 into an enclosed piston space 58.

The retracting means 23 are comprised of one or more pistons 59 arranged to develop a hydraulic pressure in a piston chamber 60 that is greater than the hydrostatic pressure of the well control fluids. An outlet passage 61 from the chamber 60 is controlled by a normally-closed, piston-actuated valve 62 that is itself controlled by the control valve 27.

Emergency release means 63 are also provided and include an extendible member 64 that is slidably disposed in a lateral bore 65 in the testing tool 18 that is parallel to the piston bore 32. Passages 66 and 67, respectively, connect the lateral bore 65 to the sample-admitting means 21 and the hydraulic valve 62. The extendible member 64 is provided with an axial bore 68 that terminates just short of its outer end 69. The outer end 69 of the extendible member 64 is weakened, as by a notch 70, to permit the member to be broken whenever a lateral or sideward force is applied thereto. The opposite end of the axial bore 68 is enlarged, as at 71, and opened to the passages 66 and 67. A spring-biased ball check valve 72 disposed in the enlarged bore 71 permits entry of well fluids once the end 69 is broken-off but prevents loss of hydraulic fluid should the end be broken.

In operating the tool 18, the apparatus 10 is positioned as shown in FIG. 1 opposite the formation 13. Then, the control valve 26 is opened to simultaneously extend the piston 31 and extendible member 64 in opposite directions. Once the back of the apparatus 10 and, hopefully, the outer end 69 of the extendible member 64 has engaged one wall of the borehole 12, continued movement of the piston member 31 will sealingly engage the sealing member 28 against the opposite wall of the borehole. The flow-line valve 53 must, of course, be opened (by opening the control valve 25) to admit fluid samples into the sample-collecting compartment 44.

In some instances, it may be that formation fluids are incapable of flowing readily through the sealed-off portion of the formation 13. Accordingly, should measurements from the pressure transducer 52 indicate that no fluid sample has been collected, the power source 16 is connected to the detonator 41 and the shaped charge 40 is detonated. The resultant perforating jet from the shaped charge 40 will produce a perforation that, should there be recoverable formation fluids, will permit such fluids to enter the sample-admitting means 21 and flow into the compartment 44.

Whenever a sufficient time has elapsed or else pressure measurements from the transducer 52 indicate that the sample-collecting compartment 44 is most likely full, the control valve 24 is opened. Opening of the control valve 24 will close the seal valve 54 and trap whatever fluids there may be in the sample-collecting compartment 44. To retrieve the apparatus 10, the control valve 27 is then opened to in turn open the normally-closed hydraulic valve 62 and admit the hydraulic fluid into the spaces 34 and 35 that were initially at atmospheric pressure. Since the hydraulic pressure is greater than the hydrostatic pressure of the well control fluids, as the hydraulic fluid enters the passages 38, 66 and 67 and spaces 34 and 35, the piston 31 and extendible member 64 are usually returned to their initial positions.

To prevent the differential between the hydrostatic and formation pressures from holding the sealing member 28 against the formation 13 when it is desired to retract it, a piston-actuated equalizing valve 73 is so arranged that when the control valve 27 is opened, the pressure of the hydraulic fluid will also open the equalizing valve to admit well control fluids into the bore 30. Once well control fluids are admitted into the bore 30, they will equalize pressures across the sealing member 28 and facilitate its disengagement from the formation wall.

Should the hydraulic retracting means 23 not function properly, the apparatus 10 is retrieved by picking up on it to break the outer end 69 of the extendible member 64 across the notch 70 if this outer end is against the formation. Although there will be no positive retracting forces as where hydraulic pressure is applied, the hydrostatic pressure acting across the retractable members 31 and 64 will at least be equalized. Once these pressure forces are removed, the apparatus 10 can be pulled upwardly and the sealing member 28 and extendible member 64 will gradually be worked back into their respective retracted positions.

It will be appreciated, therefore, that each of the tools 18 requires a large number of electrical and fluid lines. The number of lines extending through the apparatus 10 is, of course, determined by the number of tools 18 comprising the apparatus. Since each tool 18 requires several separate conductors, if there are three, four or even six of the tools coupled together, provisions must be made to connect a substantial number of electrical conductors at each of the joints of the apparatus 10.

As seen in FIG. 1, to keep the apparatus 10 within manageable proportions, it is preferred to combine two sample-admitting means 21 and their associated valves into an integral body, as at 74, and enclose the sample-collecting means 22 for each of the tools 18 in separate bodies or housings, as at 75 and 76. The interconnector 19 is used to couple the adjacent housings 75 and 76 and the interconnector 20 is used to couple the housing 75 to the body 74.

Accordingly, as best seen in FIGS. 3A and 3B, the upper end of the sample-collecting section 75 is coupled by the interconnector 20 to the lower end of its associated sample-admitting section 74 and its lower end is coupled by the interconnector 19 to the upper end of the adjacent sample collecting section 76. To accommodate the electrical operating lines or conductors running to the other tools 18 therebelow, a tubular conduit 77 is disposed through the compartments 44 and 45 along the central axis of the sample-collecting section and fluidly sealed relative thereto as by O-rings 78 and 79 at each end. The piston 48 must, of course, be made annular and is fluidly sealed around the tubular conduit 77 by O-rings 80.

A fluid connection is provided between the sample-admitting section 74 and the sample-collecting section 75 corresponding to the operating line or passage 51 (FIG. 2) above the seal valve 54. As seen in FIG. 3A, to make this fluid connection, line-connection means are provided such as a longitudinally projecting tubular member 81 secured to the sample-admitting section 74 and adapted for reception in a complementary longitudinal bore 82 in the upper end of the interconnector 20. Sealing means, such as O-rings 83 around the free end of the tubular extension 81, complete the fluid-tight connection of the fluid operating line.

To mechanically couple the interconnector 20 to the sample-admitting section 74, the lower end of the sample-admitting section is counterbored, as at 84, and adapted to receive the reduced-diameter free end 85 of the interconnector. Selectively operable connecting means are provided such as an externally threaded collar 86 loosely mounted around the free end 85 of the interconnector 20 and adapted for threaded engagement with internal threads 87 within the counterbored end 84 of the sample-admitting section 74. A shoulder 88 on the interconnector 20 and a split-ring 89, respectively, immediately below and above the loose collar 86 confine the collar against significant longitudinal movement.

As will soon become apparent, once the tubular extension 81 is aligned with its associated bore 82, the collar 86 is threadedly engaged with the threads 87 and tightened by further rotation of the collar. As the collar 86 is rotated, the sections 74 and 75 will be pulled together to insert the tubular extension 81 into its receptive bore 82. The interconnector 20 and sections 74 and 75, of course, do not rotate as the collar 86 is being turned. An O-ring 90 around the extremity of the end portion 85 fluidly seals the sample-collecting section 74 relative to the interconnector 20 whenever the two members are finally coupled.

Electrical interconnection between the sections 74 and 75 is accomplished by mounting electrical line-connection means such as opposed, axially aligned, mating, multi-contact connector members 91 and 92, respectively, in the adjacent ends of the section 74 and interconnector 20, with one of the connector members being capable of limited rotation and longitudinal movement and the other connector being secured against both rotational and longitudinal movement. To accomplish this, the connector 92 on the interconnector 20 is secured to the adjacent end of the conduit 77.

As best seen in FIG. 4, a snap ring 93 is disposed in a complementary peripheral groove around the connector 92 and abutted against the end of the conduit 77 to secure the connector against longitudinal movement into the conduit. An external key 94 (rotated 90° in FIG. 4 from its normal position) on the snap ring 93 and received in a longitudinal, open-ended slot in the end of the conduit 77 co-rotatively secures the connector 92 thereto. A threaded cap or ring 95 fitting over the connector 92 is threadedly coupled to the conduit 77 to confine the connector in position.

To fix the conduit 77 with respect to the interconnector 20 and sample-collecting section 75, the exposed end of the conduit is secured, as by a weld 96, a to U-shaped guide member 97 that straddles the upper end of the conduit and is itself secured to the interconnector. Although the guide member 97 may be fastened to the interconnector 20 by one or more longitudinal screws (not seen in the drawings), it is co-rotatively secured relative thereto by more positive means, such as a key or locating pin 98 snugly received within a complementary longitudinal recess or bore 99 in the interconnector body. By relying upon the snugly fitting locating pin 98 rather than the fastening screws, the guide member 97, conduit 77, connector 92 and interconnector 20 are quite accurately positioned in a particular predetermined orientation with respect to one another.

The other electrical connector 91 is mounted in the open end of a short sleeve or tubular member 100 and firmly secured thereto in a manner as already described with respect to the connector 92. The opposite end of the tubular member 100 is telescopically fitted over the free end of a short sleeve or tubular member 101 that is co-rotatively secured at its base to the sample-admitting section 74 by means, such as a snugly received key or locating pin 102. Lateral pins 103 on opposite sides of one member are each confined within enclosed longitudinal slots 104 on opposite sides of the other member to limit the relative rotation and longitudinal movement of the tubular members 100 and 101 to the extent permitted by the loose fit of the pin between the opposite sides of the slot. Biasing means, such as springs or wavy washers alternated with annular spacers 105, normally urge the telescoping members 100 and 101 apart to the extent permitted by the longitudinal freedom of the pins 103 within the slots 104.

As previously discussed, when the two sections 74 and 75 are being coupled, they must be so oriented that both the electrical connectors 91 and 92 and the fluid connectors 81 and 82 are accurately aligned. It will be appreciated, of course, that since the electrical connectors 91 and 92 cannot be observed as the sections 74 and 75 are being coupled, very exacting measures must be taken to ensure that the connectors are precisely oriented before the connector pins enter their respective sockets so as to avoid damaging these small connector pins.

Accordingly, to accomplish such precise orientation, the U-shaped guide member 97 is straddled over the conduit 77 with its legs on opposite sides of the entrance to the bore 82. Moreover, by suitably proportioning the longitudinal dimensions of these members 81 and 97, the sections 74 and 75 cannot be brought close enough together for the collar 86 to be threadedly connected to the threads 87 until the free end of the tubular extension 81 is between the spaced legs of the guide member 97. In this manner, the free end of the tubular extension 81 (which serves as a key member) and the opposed, spaced surfaces of the guide member 97 are means to guide the sample-admitting section 74 into a fairly accurate orientation with respect to the sample-collecting section 75 before the tubular extension can even be inserted into its receptive bore 82.

The tubular extension 81 and the opposed spaced surfaces between the legs of the guide member 97 will therefore serve as "coarse" guides by which a longitudinal slot 106 on the free end of the tubular member 100 and an inwardly directed key member or lateral pin 107 on the guide member can be aligned. By making the entrance to the slot 106 convergent (FIG. 5), as the pin 107 first enters the slot 106 the lateral play of the pins 103 in the slots 104 will allow the tubular member 100 to rotatively adjust itself around member 101 in relation to the lateral pin 107. Then, by the time the pin 107 is into the closely fitting rearward portion of the slot 106, the connector 91 will have been oriented accurately with the other connector 92 that their mating pins and sockets will be precisely aligned. It will be understood that the lateral dimensions of the pin 103 and slot 104 are appropriately sized in relation to the slot 106 and pin 107 to allow the tubular member 100 to rotate as required within maximum tolerance limits to orient the connector 91 with the connector 92.

The wavy washers 105 are appropriately selected to urge the connectors 91 and 92 together with only sufficient force to ensure that the connector pins will readily enter their respective sockets. Thus, until the slot 106 and pin 107 are accurately aligned, the spring action of the wavy washers 105 will permit the tubular member 100 to retract slightly but still maintain the forward end of the tubular member in position for the slot 106 to accept the pin 107 once they are aligned. It will be seen also that once the connectors 91 and 92 are connected, any further longitudinal adjustment of the tubular member 100 will be accommodated by the wavy washers 105. In this manner, bending of the connector pins is avoided.

The electrical and mechanical connections at the other end of the sample-collecting section 75 are arranged very similarly to those already described. As best seen in FIG. 3B, an electrical connector 108 is mounted in the other end of the conduit 77 in the same manner as already described with reference to the connector 92. It will be appreciated, therefore, that the conduit 77, the connectors 92 and 108, their interconnecting cable 109, and the guide member 97 comprise a self-contained assembly that is oriented to the interconnector 20 and sample-collecting section 75 by the pin 98 in its bore 99. Since the conduit 77 is not secured at its lower end, it and the above-named other members of this assembly can be removed from or installed into the sample-collecting section 75 without being disrupted. Moreover, since the guide member 97 has an established orientation relative to both the connector 91 and the connector 92, these connectors will always be in a predetermined orientation with one another as well as to the connector 108 whenever the interconnector 20 is coupled to the sample-receiving section 74. It should be recognized as well that the interconnector 20 can be connected to the sample-collecting section 75 without regard to their relative orientations.

The interconnector 19 is arranged to mechanically couple adjacent tools 18 to one another as well as to appropriately connect the electrical conductors therein. It will be appreciated, therefore, that since the sample-collecting sections 75 and 76 are identical, the opposite ends of the interconnector 19 will also be identical. In addition to reducing the number of different parts, this will permit either end of the interconnector 19 to be coupled to either of the sections 75 or 76.

As best seen in FIG. 3B, the interconnector 19 is comprised of a short, outer tubular housing 110 that is threadedly coupled between the adjacent sections 75 and 76 and a detached interconnecting electrical assembly 111. Externally threaded collars 112 and 113 on the sections 75 and 76 are respectively adapted for connection to internal threads 114 and 115 in the opposite ends of the housing 110. These collars 112 and 113 are arranged in the same manner as the collar 86 and therefore need no further description. O-rings 116 and 117, respectively, fluidly seal the outer housing 110 relative to the adjacent sections 75 and 76.

The interconnector 19 includes guiding means 118 and 119 at its respective ends that are suitably arranged to accurately orient the adjacent ends of the sections 75 and 76 with respect to one another. To accomplish this, the guiding means 118 and 119 include identical alignment sleeves 120 and 121, respectively. The alignment sleeves, 120 for example, are each comprised of an enlarged-diameter portion 122 adapted for reception in one end of the tubular housing 110 and a short, reduced-diameter portion 123 adapted for reception in the entrance to a counterbore 124 in the adjacent end of the section 75. Longitudinally projecting lugs 125 and 126 are symmetrically arranged relative to the central axis of the sleeve 120 and extended beyond the reduced-diameter portion 123 for reception in the counterbore 124. The enlarged-diameter end portion 122 of the alignment sleeve 120 is provided with an open-ended longitudinal slot 127 adapted to receive a lateral pin 128 projecting inwardly from the tubular housing 110.

The alignment sleeve 120 is adapted to be corotatively secured relative to the sample-collecting section 75 in such a manner that it can be positioned in any orientation over a full 360° circle after all interconnecting threaded joints, such as at 129 and 130 (FIG. 1), in the sample-collecting section are made-up. To accomplish this, longitudinally extending bolts 131 (only one being shown) are each threaded into one of several longitudinal holes 132 spaced equally about the central axis of the section 75, with the shank of each bolt being received in one of two substantially semi-circular arcuate slots 133 (only one shown) symmetrically arranged through the end wall of the alignment sleeve 120 on each side of the lugs 125 and 126. Thus, once the conduit 77 is installed within the sample-collecting section 75, the alignment sleeve 120 can be rotated as required to accurately orient it in relation to the connectors 92 and 108 before the bolts 131 are tightened. To firmly secure the alignment sleeve 120 to the section 75 once it is correctly oriented, tapered wedges 134 and 135 each having a roughened or toothed exterior, as at 136, are disposed in complementally tapered, longitudinal recesses 137 and 138 in the exterior of the lugs 125 and 126, respectively. Whenever the bolts 131 are tightened, the exterior teeth 136 of the wedges 134 and 135 will bite into the adjacent internal surfaces of the counterbore 124 to positively secure the alignment sleeve 120 against rotation. The sleeve 121 is similarly secured to the other section 76.

Once the alignment sleeve, 120 for example, is secured in position, the longitudinal slot 127 and an inwardly directed key member or locating pin 139 thereon will be oriented as desired with respect to the section 75. This will position the slot 127 and pin 139 in a predetermined orientation in relation to the electrical connector 108 as well as to the electrical connectors 91 and 92 at the opposite end of the section 75. It is, of course, preferable to select a consistent alignment throughout the apparatus 10.

Figure 5:
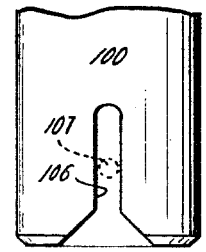
FIG. 5 is a partial view of a portion of the interconnector shown in FIG. 4.

The interconnecting electrical assembly 111 is comprised of telescoped sleeves or tubular members 140 and 141 each having a connector 142 and 143 secured in its free end for mating with the connectors 108 and 144, respectively. The connectors 142–144 are each secured in the same manner as already described with reference to the connector 91. Similarly, the tubular members 140 and 141 are normally urged apart by biasing means, such as wavy washers 145, and restrained against substantial longitudinal or rotational movement by loosely confining longitudinal slots 146 in one member and lateral pins 147 in the other member in the same manner as already described with respect to the tubular members 100 and 101. Longitudinal slots, as at 148 and 149, with convergent entrance sections as shown in FIG. 5 are formed in the opposite ends of the tubular members 140 and 141 and respectively adapted to receive the lateral key members or pins, as at 139 and 150, in the alignment sleeves 120 and 121. To maintain the orientation consistent, the locating slots 148 and 149 at opposite ends of the telescoped sleeve members 140 and 141 are kept in the same orientation.

It will be understood that the alignment sleeves 120 and 121 will be secured to their respective sections 75 and 76 and left in place. Only when one of the sections 75 or 76 is disassembled will it be necessary to reposition the sleeves 120 and 121. Thus, to couple the sections 75 and 76 together, it is necessary only to couple the housing 110 and electrical assembly 111 to one of the sections. The other section is then coupled thereto in about the same manner as already described with reference to FIG. 4, except that the slot and pin (127 and 128 for example) will serve as the coarse guiding means rather than the tubular extension 81 and guide member 97.

It will be appreciated, therefore, that each of the interconnector means 19 and 20 will ensure that the tools 18 are all in the same relative orientation when the apparatus 10 is fully assembled. This will not only position each of the sample-admitting means 21 in the same orientation but will also have the obvious advantage of also permitting any sample-admitting section, as at 74, to be used with any sample-collecting section, as at 75, without having to custom fit one particular section for use with only another particular section.

To couple any section (whether the interconnector means 19 or 20 is being used), it is necessary only to align the coarse guide means—the tube 81 and guide member 97 or the pin 128 and its receptive slot 127. Then, only when these coarse guide means are aligned, can the collars, as at 86 for example, be threadedly engaged. The divergent sections in the slots, as at 106 in FIG. 5, are sufficiently wide that any misorientation (such as caused by tolerance accumulations) in the mating electrical connectors will be compensated for in the fine guide means by rotating one of these connectors into position as the pin (107 for example) moves further into its receiving slot. Since one of the mating electrical connectors in each mating pair is resiliently biased, any difference in longitudinal position such as might be caused by even allowable manufacturing tolerance variations in the length of the various members will be compensated for.

Accordingly, it will be appreciated that the present invention has provided new and improved means for releasably connecting electrical conductors for multi-sectional well tools that can be now assembled with little or no difficulty even though the tool sections being interconnected are quite bulky and difficult to handle and their electrical connectors are inaccessible during their connection. By providing coarse guide means that will position the interconnecting elements fairly close to their desired orientation, the fine guide means can then positively align the electrical connectors as they are brought together. In this manner, well tools can be coupled together in as many sections as desired without fear of malfunctions caused by improper electrical connections.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. In a well tool having first and second separable bodies with each having at least one operating line therein adapted for interconnection with one another, means for tandemly connecting the adjacent ends of said bodies in coincidental alignment and comprising: means on said adjacent body ends for interconnecting said operating lines including first and second opposed line-connection means respectively arranged and adapted for co-engagement upon orientation relative to one another and relative longitudinal movement of said adjacent body ends toward one another; first guiding means responsive to longitudinal movement of said adjacent body ends toward one another arranged for orienting said bodies into a selected angular position after said bodies are in coincidental alignment; second guiding means for subsequently orienting said first and second line-connection means relative to one another to permit their interconnection as said adjacent body ends are being oriented and brought together; and selectively operable means for connecting said adjacent body ends to one another.

2. The well tool of claim 1 wherein said operating lines are electrical conductors and said line-connection means include mating electrical connectors; and said second guiding means are positioned to be operable only after said bodies are oriented and said connecting means are connecting said adjacent body ends to one another.

3. The well tool of claim 2 further including means for limiting longitudinal movement of said electrical connectors relative to one another; and biasing means normally urging said electrical connectors toward one another but yieldable in response to movement of said bodies toward one another until at least just before said connecting means have connected said adjacent body ends to one another.

4. The well tool of claim 2 wherein said first guiding means include slot-and-key means on said adjacent body ends, respectively; and wherein said second guiding means include first and second longitudinally-disposed telescoped sleeve members, means securing said first sleeve member to one of said adjacent body ends, means securing one of said electrical connectors to the free end of said second sleeve member, laterally-spaced longitudinal guide means on one of said sleeve members, a key member on the other of said sleeve members loosely confined between said longitudinal guide means, and biasing means normally urging said sleeve members apart but yieldable in response to movement of said adjacent body ends toward one another until just before said connecting means have connected said adjacent body ends to one another.

5. The well tool of claim 4 wherein said means securing said first sleeve member include slot-and-key means on said one adjacent end and said first sleeve member, respectively.

6. The well tool of claim 1 wherein said operating lines include electrical conductors and at least one fluid passage means and said line-connection means include mating electrical connectors for said electrical conductors, a longitudinally-extending tubular member on one of said body ends, and a complementary longitudinal bore in the other of said body ends for sealingly receiving said tubular member.

7. The well tool of claim 6 wherein said first guiding means include a guide member having opposed, spaced surfaces facing one another on opposite sides of the entrance to said longitudinal bore, and the longitudinal dimensions of said guide member and said tubular member prevent cooperation of said connecting means until the free end of said tubular member is between said spaced surfaces of said guide member; and said second guiding means further include means between said electrical connectors for orienting said electrical connectors relative to one another only after said free end of said tubular member is between said spaced surfaces of said guide member and as said connecting means are being operated.

8. The well tool of claim 1 wherein said operating lines are fluid passage means; and said line-connection means include a longitudinally-extending tubular member on one of said body ends, and a complementary longitudinal bore in the other of said body ends for sealingly receiving said tubular member.

9. The well tool of claim 8 wherein said first guiding means include a guide member having opposed, spaced surfaces facing one another on opposite sides of the entrance to said longitudinal bore, and the longitudinal dimensions of said guide member and said tubular member prevent cooperation of said connecting means until the free end of said tubular member is between said spaced surfaces of said guide member and aligned with said entrance.

10. In a multi-sectional well tool having a first body with a reduced-diameter end portion; a second body with a longitudinal counterbore in one end portion thereof and adapted to sealingly receive said reduced-diameter end portion of said first body; a threaded ring rotatably mounted around one of said end portions and adapted for threaded engagement with the other of said end portions to tandemly connect said bodies to one another; and a plurality of first and second electrical conductors respectively in said bodies, means for interconnecting said first and second conductors comprising: first and second mating electrical connectors respectively connected to said first and second conductors and facing one another along a common longitudinal axis; first means co-rotatively securing said first electrical connector relative to one of said bodies in a desired orientation relative thereto; second means connecting said second electrical connector to the other of said bodies for limited rotation relative thereto; first guiding means for orienting said bodies relative to one another before said threaded ring is threadedly engaged with said other end portion; and second guiding means for orienting said second electrical connector into said desired orientation for mating engagement with said first electrical connector before said threaded ring is fully threaded with said other end portion.

11. The well tool of claim 10 further including means between said first and second means for limiting longitudinal movement of said electrical connectors relative to one another; and biasing means normally urging said electrical connectors toward one another but yieldable in response to movement of said bodies toward one another until just before said threaded ring is fully threaded with said other end portion.

12. The well tool of claim 10 further comprising fluid passage means in each of said bodies; and means for interconnecting said fluid passage means including a longitudinally-extending tubular member projecting from one of said end portions, and a complementary longitudinal bore in the other of said end portions adapted to sealingly receive said tubular member.

13. The well tool of claim 12 wherein said first guiding means include a guide member having opposed, spaced surfaces on opposite sides of the entrance to said longitudinal bore and the longitudinal dimensions of said guide member and said tubular member prevent threaded engagement of said threaded ring with said other end portion until the free end of said tubular member is between said spaced surfaces of said guide member.

14. The well tool of claim 10 wherein said first guiding means include a longitudinal slot having an open end on one of said end portions and a key member on the other of said end portions adapted for passage through said open end and reception in said longitudinal slot; and said second guiding means include slot-and-key means between said electrical connectors and said one body for cooperation with one another only after said key member has entered said longitudinal slot.

15. The well tool of claim 14 further including means between said first and second means for limiting longitudinal movement of said electrical connectors relative to one another, and biasing means normally urging said electrical connectors toward one another but yieldable in response to movement of said bodies toward one another until just before said slot-and-key means are fully engaged.

16. The well tool of claim 10 wherein said second connecting means include first and second longitudinally-disposed telescoped sleeve members, means securing said first sleeve member to said other body, means securing said second electrical connector to the free end of said second sleeve member, laterally-spaced longitudinal guide means on one of said sleeve members, a key member on the other of said sleeve members loosely confined between said longitudinal guide means, and biasing means normally urging said sleeve members apart but yieldable in response to movement of said bodies toward one another until just before said threaded ring is fully threaded with said other end portion; and wherein said second guiding means include slot-and-key means on said second sleeve member and said one body for cooperation together only after said first guiding means has oriented said bodies relative to one another.

17. The well tool of claim 16 wherein said first guiding means include a longitudinal slot having an open end on one of said end portions, and a key member on the other of said end portions adapted for passage through said open end and reception in said longitudinal slot.

18. The well tool of claim 10 wherein said guiding means include a guide member releasably secured to said one body and movable relative thereto into a desired orientation with respect to said first electrical connector; said first guiding means include slot-and-key means on said other body and said guide member; and said second guiding means include slot-and-key means between said guide member and said second electrical connector.

19. The well tool of claim 18 wherein said key means of said first guiding means include an inwardly-projecting lateral member on said other body.

20. The well tool of claim 18 further including fluid passage means in each of said bodies; means for interconnecting said fluid passage means including a longitudinally-extending tubular member projecting from said other body to comprise said key means of said first guiding means, and a complementary longitudinal bore in said one body adapted to sealingly receive said tubular member; and wherein said guide member has opposed, spaced surfaces facing one another on opposite sides of the entrance to said longitudinal bore to comprise said slot means of said first guiding means.

21. A well tool for use in a well bore, and comprising: interconnected housing assemblies having fluid flow lines and electrical connection lines for coupling to one another; said housing assemblies having adjacent complementary male and female flow lines and electrical connection lines, said male flow line being adapted to interfit with said female flow line prior to interfitting of said electrical connection lines when said assemblies are moved toward an interconnecting position; and means on one of said electrical connection lines cooperative with the other electrical connection line to rotate said electrical connection lines into an aligned interconnecting position prior to interconnection of said electrical connection lines, whereby said assemblies can be interconnected in a proper interfitting relationship.

References Cited

UNITED STATES PATENTS

| | | | |
|---|---|---|---|
| 709,216 | 9/1902 | Goodwin | 339—16 |
| 2,291,070 | 7/1942 | Bruno | 339—16 X |
| 2,339,274 | 1/1944 | Kothny | 339—16 |
| 2,750,569 | 6/1956 | Moon | 339—16 |
| 2,810,118 | 10/1957 | Swan | 339—186 X |
| 3,110,537 | 11/1963 | Poetzsch et al. | 339—16 |
| 3,327,784 | 6/1967 | Pardue | 166—65 |

RICHARD E. MOORE, *Primary Examiner.*

U.S. Cl. X.R.

339—65; 166—65, 100